United States Patent
Snyder

(10) Patent No.: US 11,719,278 B2
(45) Date of Patent: Aug. 8, 2023

(54) PRELOADED ELASTOMERIC BUSHING

(71) Applicant: ContiTech Vibration Control GmbH, Hannover (DE)

(72) Inventor: Curtis Snyder, Lucan (CA)

(73) Assignee: ContiTech Vibration Control GmbH, Hannover (DE)

( * ) Notice: Subject to any disclaimer, the term of this patent is extended or adjusted under 35 U.S.C. 154(b) by 127 days.

(21) Appl. No.: 17/129,022

(22) Filed: Dec. 21, 2020

(65) Prior Publication Data

US 2022/0196064 A1    Jun. 23, 2022

(51) Int. Cl.
| | |
|---|---|
| *F16C 17/10* | (2006.01) |
| *F16C 33/20* | (2006.01) |
| *F16F 1/373* | (2006.01) |
| *F16F 1/38* | (2006.01) |

(52) U.S. Cl.
CPC .............. *F16C 17/10* (2013.01); *F16C 33/20* (2013.01); *F16F 1/3732* (2013.01); *F16F 1/3835* (2013.01)

(58) Field of Classification Search
CPC ......... F16C 17/10; F16C 13/20; F16F 1/3732; F16F 1/3835; F16F 1/387; F16F 2232/20
USPC ...................................................... 267/141.2
See application file for complete search history.

(56) References Cited

U.S. PATENT DOCUMENTS

| | | | |
|---|---|---|---|
| 1,983,796 A | 12/1934 | Geyer | |
| 5,122,011 A | 6/1992 | Missig | |
| 5,288,059 A | 2/1994 | Gautheron et al. | |
| 6,241,225 B1 | 6/2001 | Krause | |
| 2004/0017034 A1* | 1/2004 | Asano | F16F 1/387 267/293 |
| 2006/0290040 A1 | 12/2006 | Kumper | |
| 2008/0284076 A1* | 11/2008 | Miyahara | F16F 1/387 267/140.13 |
| 2009/0179362 A1* | 7/2009 | Ebert | F16F 1/3828 267/293 |
| 2012/0001398 A1 | 1/2012 | Darcy-Sharma | |
| 2014/0300040 A1* | 10/2014 | Tarnawsky | B62D 21/11 267/292 |
| 2015/0247543 A1* | 9/2015 | Kuki | F16F 1/393 156/92 |
| 2017/0080772 A1 | 3/2017 | Matsumura et al. | |
| 2017/0097061 A1 | 4/2017 | Rawlings et al. | |

(Continued)

FOREIGN PATENT DOCUMENTS

| | | |
|---|---|---|
| DE | 69201279 T2 | 9/1995 |
| DE | 69113955 T2 | 3/1996 |
| DE | 19638554 A1 | 4/1997 |

(Continued)

OTHER PUBLICATIONS

EP Search Report dated May 31, 2022 of counterpart EP application 21214162.

*Primary Examiner* — Nicholas J Lane
*Assistant Examiner* — San M Aung
(74) *Attorney, Agent, or Firm* — Gregory Adams; David L. Cate

(57) ABSTRACT

A compressible bushing includes an end having a first outer diameter. The compressible bushing also includes a bumper section having a second outer diameter greater than or equal to the first outer diameter and may include of a compressible material. The compressible bushing also includes an opening passing through the end and the bumper section, the opening having an inner diameter.

9 Claims, 4 Drawing Sheets

(56) References Cited

U.S. PATENT DOCUMENTS

2019/0301556 A1   10/2019   Itano et al.

FOREIGN PATENT DOCUMENTS

| | | |
|---|---|---|
| DE | 19820773 A1 | 11/1999 |
| DE | 102005029614 A1 | 1/2007 |
| DE | 102011001235 A1 | 9/2012 |
| DE | 102016010313 A1 | 3/2017 |
| DE | 102016118625 A1 | 4/2017 |
| DE | 102016010105 A1 | 2/2018 |
| DE | 102017106204 A1 | 9/2018 |
| EP | 1186794 A2 * 3/2002 | ............ F16F 1/3863 |
| EP | 1837533 A2 | 9/2007 |
| JP | S53115287 A | 10/1978 |
| JP | 5774333 B2 | 9/2007 |
| JP | 2013217402 A | 10/2013 |
| KR | 20040079250 A | 9/2004 |
| WO | WO-2010006597 A1 * 1/2010 | ............. F16F 13/14 |
| WO | 2019084649 A1 | 5/2019 |

* cited by examiner

… (1)

PRELOADED ELASTOMERIC BUSHING

FIELD

The field is related to elastomeric bushings and the like.

BACKGROUND

This section provides background information to facilitate a better understanding of the various aspects of the disclosure. It should be understood that the statements in this section of this document are to be read in this light, and not as admissions of prior art.

Bushings are typically rubber or polyurethane components used to isolate vibration, provide cushioning, and reduce friction between metal parts on your vehicle. Some typical vehicle bushings are control arm bushings, sway bar bushings, engine mounts, transmission mounts, chassis mounts, suspension mounts and the like. Bushings are typically positioned between a vehicle's suspension/powertrain and frame/body.

Bushings are assembled by attaching the bushing to a suspension/powertrain part and a frame/body part. The bushings experience a variety of movements based on loads of the attached suspension/powertrain parts.

The bushings have limits of acceptable load/movement amounts before failure and/or degradation occurs. Once failed, the bushing can disable and/or impair operation of a vehicle. Additionally, a costly repair and/or replacement is needed.

What is needed are techniques to mitigate bushing failure and/or degradation.

DETAILED DESCRIPTION

Figure 1:
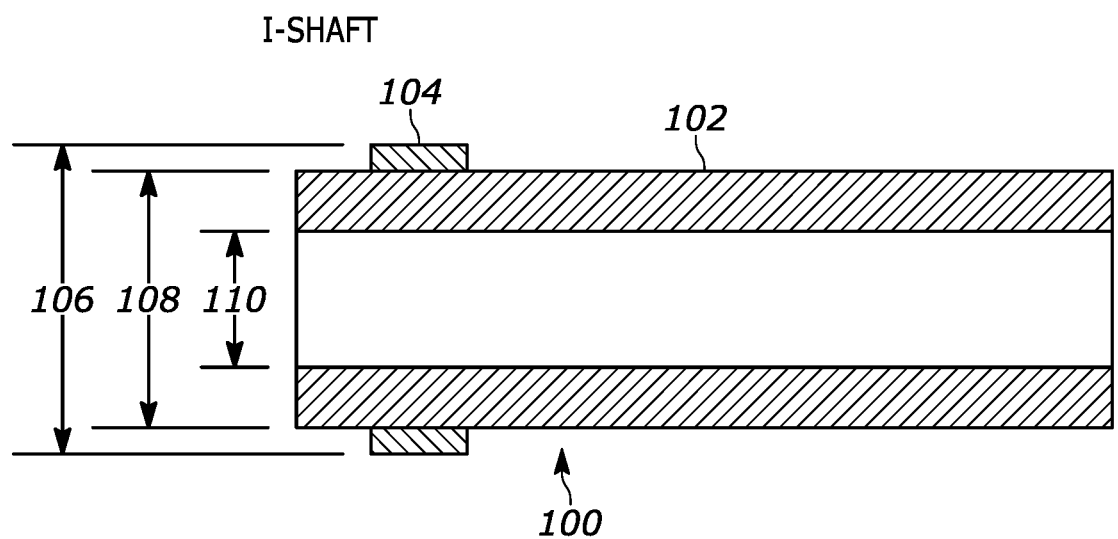
FIG. 1 is a diagram illustrating a shaft assembly 100 in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple techniques.

Bushings are typically rubber or polyurethane components or assemblies used to isolate vibration, provide cushioning, and reduce friction between metal parts on a vehicle. Some typical vehicle bushings are control arm bushings, sway bar bushings, engine mounts, transmission mounts, chassis mounts, suspension mounts and the like. Bushings are typically positioned between a vehicle's suspension/powertrain and frame/body.

Bushings are assembled by attaching the bushing to a suspension/powertrain part and a frame/body part. The bushings experience a variety of movements based on loads of the attached suspension/powertrain parts.

The bushings have limits of acceptable load/movement amounts before failure and/or degradation occurs. Once failed, the bushing can disable and/or impair operation of a vehicle. Additionally, a costly repair and/or replacement is needed.

Additionally, bushings are often preloaded when installed. For example, a bushing may be installed so that there is minimal tensile load on the bushing during normal operation. To perform this preloading, both parts attached to the bushing may need to be loaded and/or placed in awkward positions so that the bushings are preloaded and the load decreases when the parts are in standard or typical positions.

One or more embodiments are disclosed that permit installation in parts while being preloaded. These include an elastomeric bushing that is installed with a selected preload.

FIG. 1 is a diagram illustrating a shaft assembly 100 in accordance with one or more embodiments. It is appreciated that the shaft assembly 100 is provided for illustrative purposes and that suitable variations are contemplated.

The shaft assembly 100 is comprised of a suitable material, such as aluminum, steel, iron and the like. The shaft assembly 100 can be connected to other components or parts of a vehicle.

The shaft assembly 100 includes a shaft 102 and a collar 104 formed towards an end of the shaft section 102.

The shaft 102 has an inner diameter 110 and an outer diameter 108. The collar 104 has an inner diameter equal to the outer diameter 108 of the shaft 102. The collar 104 has an outer diameter 106 configured to secure the shaft 100 to a bushing.

Figure 2:
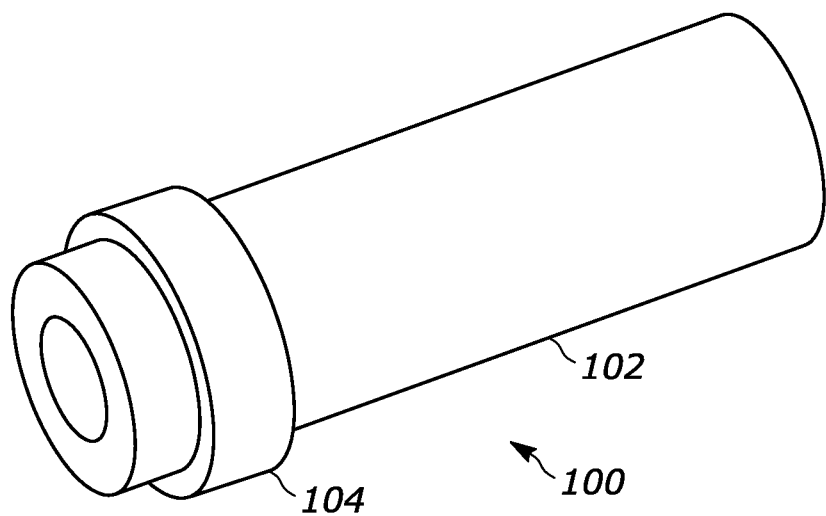
FIG. 2 is a diagram illustrating the shaft assembly 100 in accordance with one or more embodiments.

FIG. 2 is a diagram illustrating the shaft assembly 100 in accordance with one or more embodiments. It is appreciated that the shaft assembly 100 is provided for illustrative purposes and that suitable variations are contemplated.

The shaft assembly 100 is shown in FIG. 2 as a perspective view.

This view illustrates location of the collar 104 on an end of the shaft 102.

Figure 3:
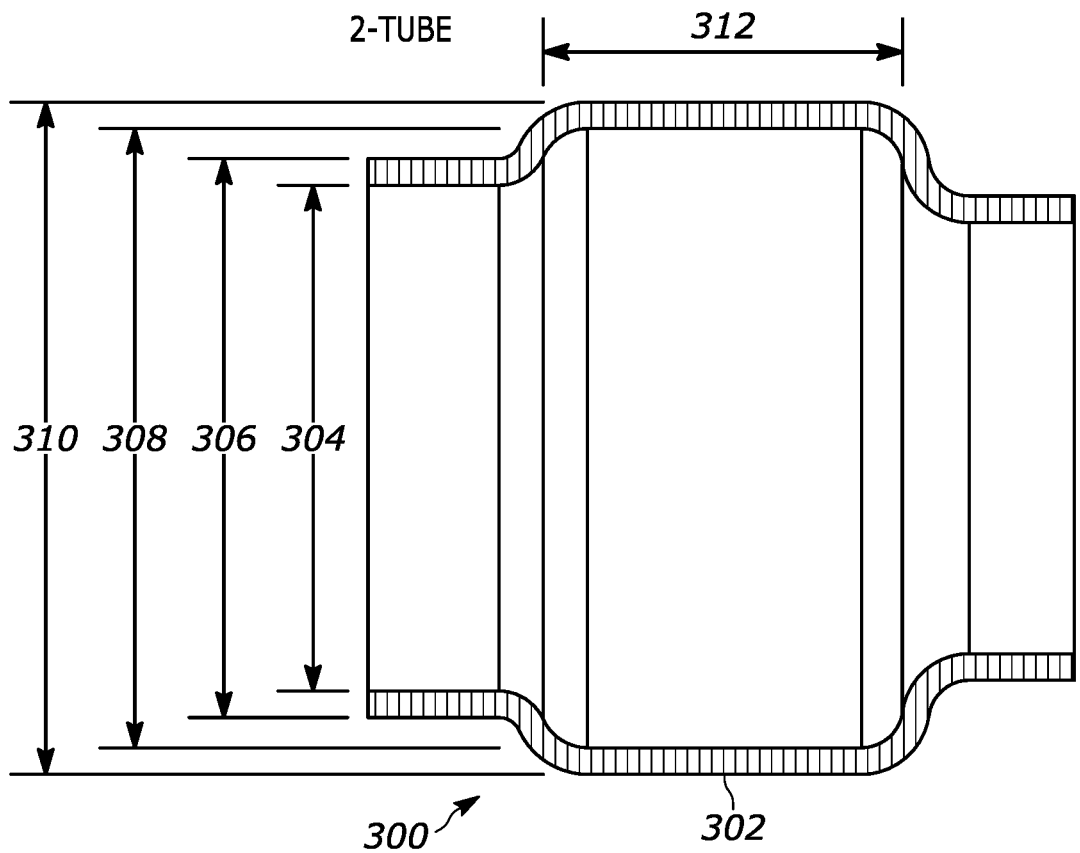
FIG. 3 is a diagram illustrating a tube 300 in accordance with one or more embodiments.

FIG. 3 is a diagram illustrating a tube 300 in accordance with one or more embodiments. It is appreciated that the tube 300 is provided for illustrative purposes and that suitable variations are contemplated.

The tube 300 includes a central or mid section 312 that accommodates installation of a bushing.

The tube 300 has an inner diameter 304 and an outer diameter 306. The inner diameter 304 generally accommodates insertion of the shaft and is typically equal to or greater than an outer diameter 108 of the shaft 102.

The mid section 312 has an inner diameter 308 and an outer diameter 310. The inner diameter 308 of the mid section is greater than the tube inner diameter 304. The inner diameter 308 of the mid section is configured to accommodate and compressibly secure a bushing.

Figure 4:
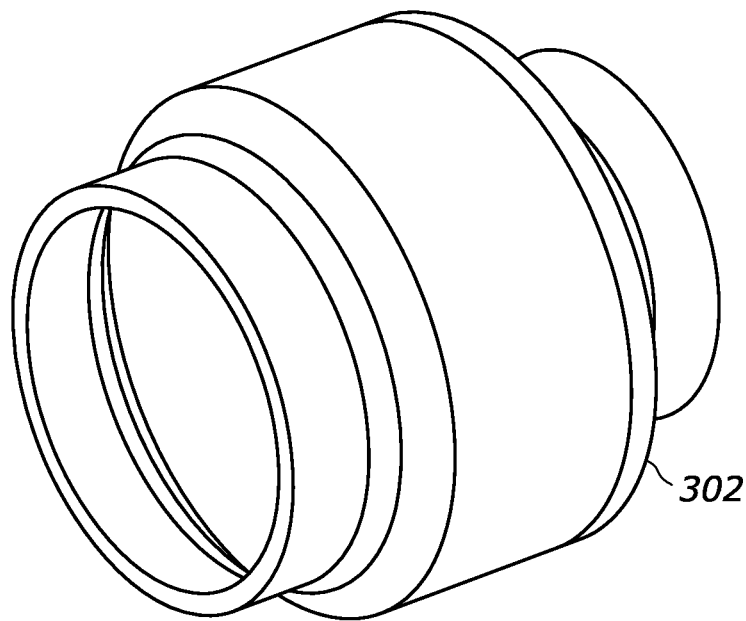
FIG. 4 is a diagram illustrating the tube 300 in accordance with one or more embodiments.

FIG. 4 is a diagram illustrating the tube 300 in accordance with one or more embodiments. It is appreciated that the tube 300 is provided for illustrative purposes and that suitable variations are contemplated.

FIG. 4 is a perspective view of the tube 300.

Figure 5:
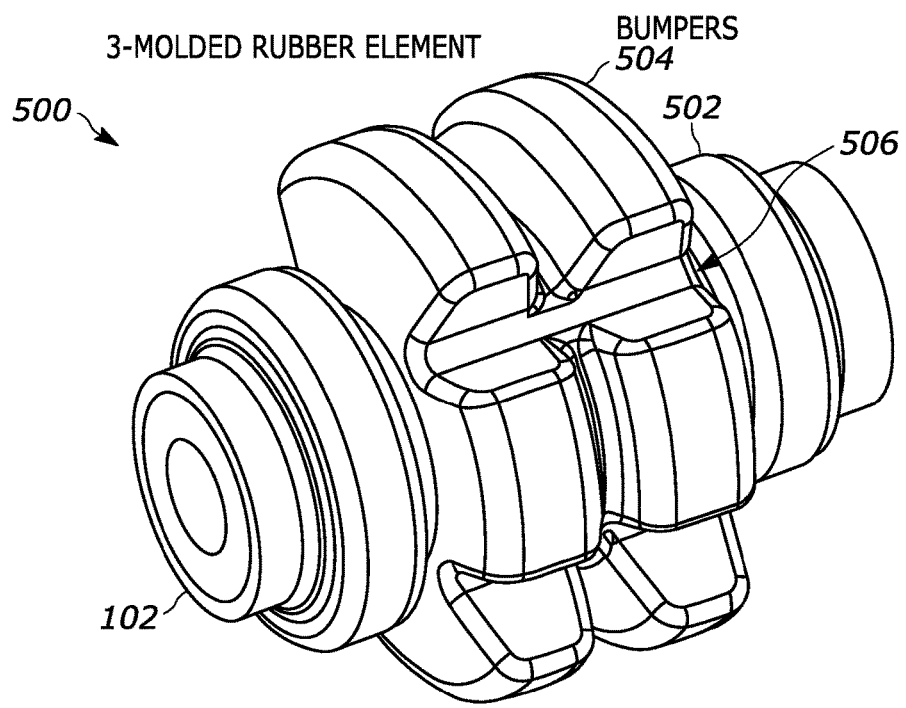
FIG. 5 is a diagram illustrating a bushing 500 in accordance with one or more embodiments.

FIG. 5 is a diagram illustrating a bushing 500 in accordance with one or more embodiments. It is appreciated that the tube 500 is provided for illustrative purposes and that suitable variations are contemplated.

The bushing 500 is comprised of a suitable and compressible material, such as an elastomeric material.

The bushing 500 is physically attached to and is located around the shaft 102.

The bushing 500 includes one or more bumpers 504. The bumpers include a plurality of gaps 506. The gaps 506 have suitable shapes, such as U or V shapes.

The bumpers 504 can be compressed to allow insertion of the bushing 500 into the mid section 312 of the tube 300. The gaps 506 are configured to facilitate suitable compression of the bumpers 504. Once inserted, the bumpers 504 expand and engage inner surfaces of the mid section 312 to secure the bushing 500 with respect to the tube 300.

Figure 6:
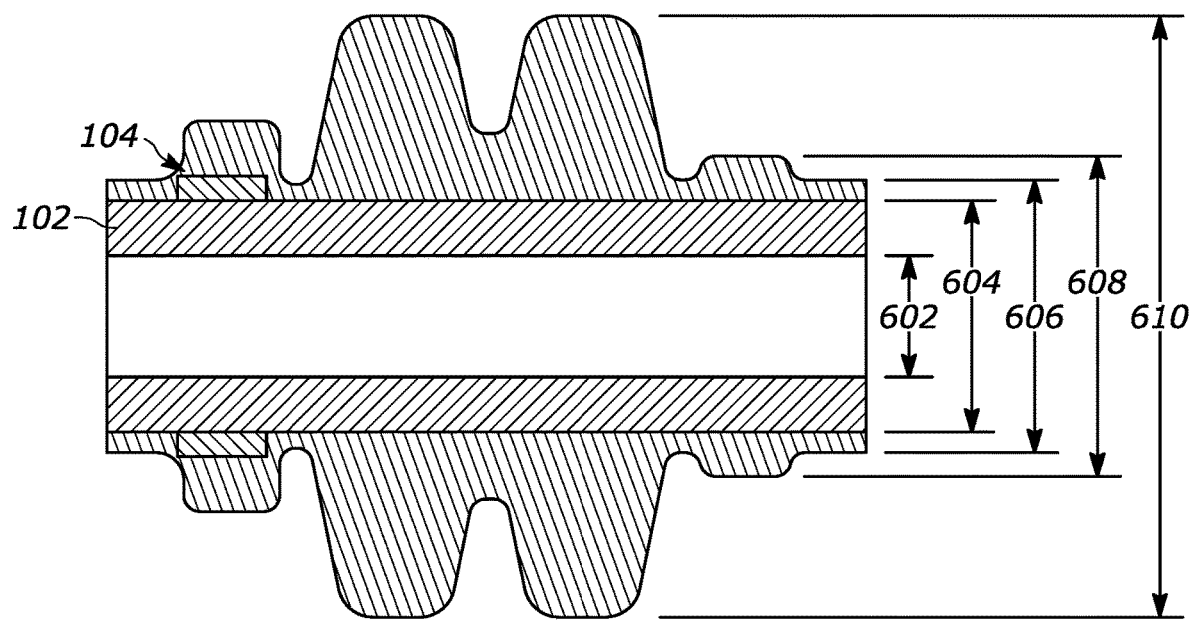
FIG. 6 is a diagram illustrating the bushing 500 in accordance with one or more embodiments.

FIG. 6 is a diagram illustrating the bushing 500 in accordance with one or more embodiments. It is appreciated that the tube 500 is provided for illustrative purposes and that suitable variations are contemplated.

FIG. 6 depicts a cross sectional view of the bushing 500.

The bushing 500 has an inner diameter 604 configured to accept and secure the shaft 102. Typically, the rubber is mold bonded to the shaft 102. In one example, the shaft is put in a mold and rubber is injected around the shaft. As a result, the rubber or bushing 500 is chemically bonded to the shaft. It is appreciated that other suitable techniques of attaching the bushing to the shaft are contemplated.

The bushing 500 has a first outer diameter 606 and a second outer diameter 608. The second outer diameter 608 can be configured to secure the collar 104.

The bumpers 504 have an outer diameter 610 configured to engage and secure the bushing to the mid section 312 of the tube 300.

Figure 7:
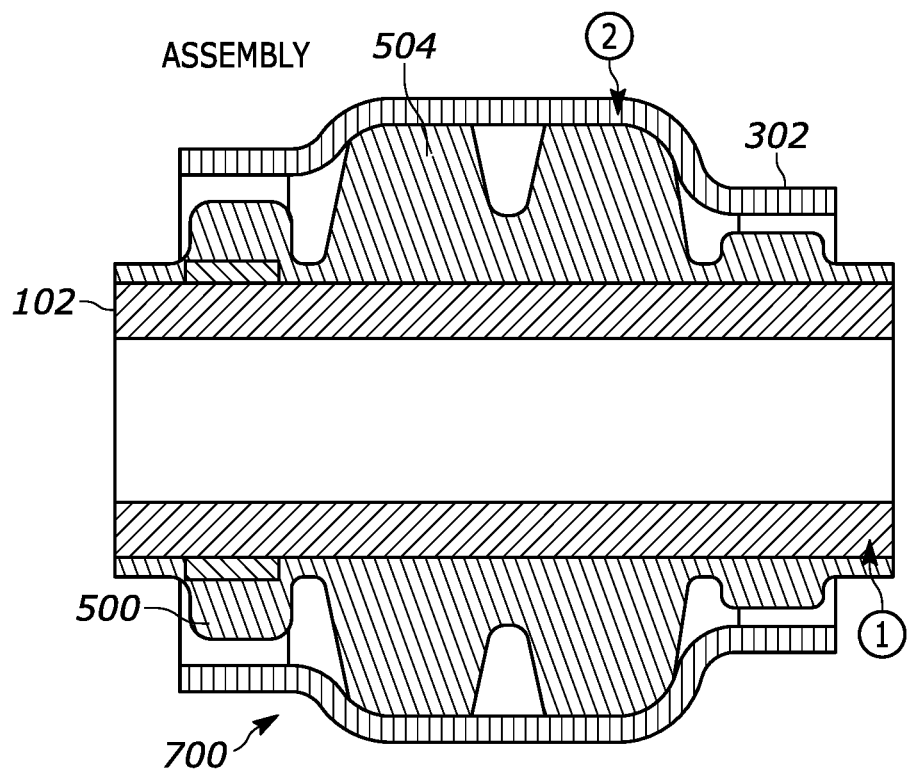
FIG. 7 is a cross sectional view of a bushing assembly 700 in accordance with one or more embodiments.

FIG. 7 is a cross sectional view of a bushing assembly 700 in accordance with one or more embodiments. It is appreciated that the assembly 700 is provided for illustrative purposes and that suitable variations are contemplated.

The bushing 500 is now attached to the shaft 102 and the tube 300, 302. The bumpers 504 were compressed to install the bushing into the tube 300, but have now at least partially decompressed to fill and expand into the mid section 312.

The bumpers 504 generally remain partially compressed after installation. The bumpers are typically compressed down to diameter 304 for installation.

Prior to the decompression, the busing 500 is configured and/or rotated to have a selected preload.

The selected preload and loading characteristics include a radial rate, an axial rate, a lateral rate and a vertical rate.

Figure 8:
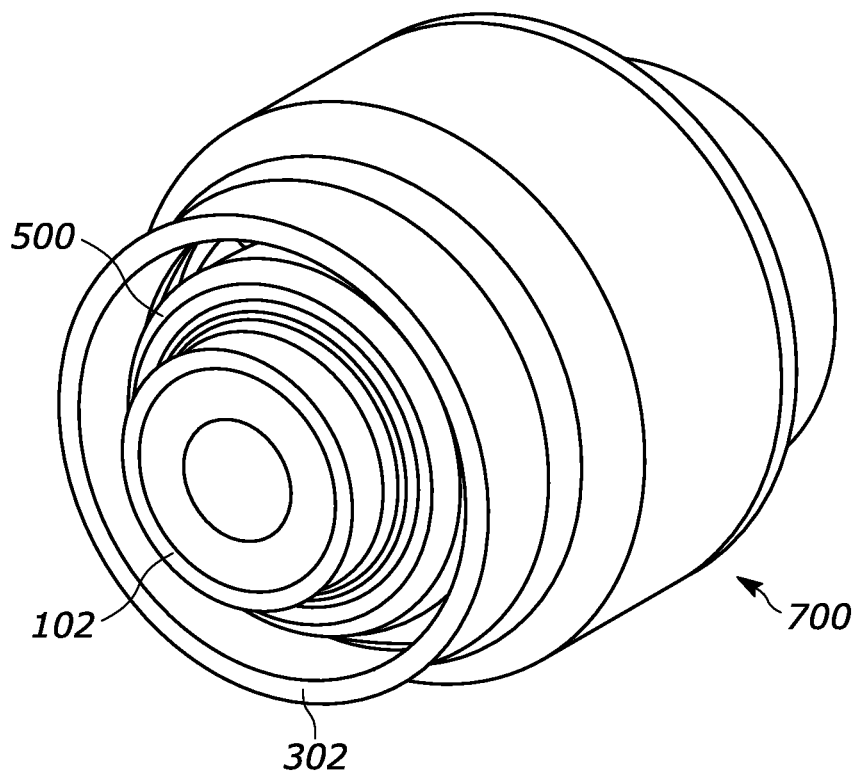
FIG. 8 is a perspective view of the bushing assembly 700 in accordance with one or more embodiments.

FIG. 8 is a perspective view of the bushing assembly 700 in accordance with one or more embodiments.

Here, the bushing 500 can be seen installed/inserted into the tube 302, 300.

In one example, a thickness of the tube 300 is 4.5 mm, however it is appreciated that other suitable thicknesses are contemplated.

In another example, the mid section 312 inner diameter 308 is 84 mm and the inner diameter 304 of the tube 302 is 66 mm. However, it is appreciated that other suitable dimensions are contemplated.

The assembly 700 can be used with a suspension/powertrain part and a frame/body part. This includes body on frame and unibody construction.

It is noted that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various examples are provided, however it is appreciated that suitable variations are contemplated.

One general aspect includes a compressible bushing. The compressible also includes an end having a first outer diameter. The compressible also includes a bumper section having a second outer diameter greater than or equal to the first outer diameter and may include of a compressible material. The compressible also includes an opening passing through the end and the bumper section, the opening having an inner diameter.

Implementations may include one or more of the following features. The bushing may include a second end having a third outer diameter less than the second outer diameter and where the opening also passed through the second end. The bushing the bumper section includes a plurality of gap regions configured to facilitate compression of the bumper section. The plurality of gap regions have a v shape. The plurality of gap regions have a u shape. The bushing the inner diameter of the opening is configured to install a shaft. The bushing an interior surface of the bushing about the opening is mold bonded to the shaft. The bushing the first end includes an expansion opening to hold a collar of the shaft. The bushing the bumper section is compressed to at least the first diameter. The bushing the bumper section is partially uncompressed causing an outer surface to be in contact with an inner surface of a mid section of a tube. The bushing the bushing installed in a tube and configured with a rotation to provide a selected pre load. Bumper section is configured to have its second outer diameter to be equal to one of an installation diameter, an installed diameter, and an uncompressed diameter, the installed diameter being greater than the installation diameter and the uncompressed diameter being greater than the installed diameter. Implementations of the described techniques may include hardware, a method or process, or computer software on a computer-accessible medium.

One general aspect includes a compressible bushing assembly, which includes a first end of a bushing having a first outer diameter. The compressible bushing assembly also includes a bumper section of the bushing having a second outer diameter greater than the first outer diameter and an outer surface. The compressible bushing assembly also includes a second end of the bushing having a third outer diameter less than the second outer diameter. The compressible bushing assembly also includes an opening of the bushing passing from the first end to the second end and passing through the one or more bumper section, the opening having an inner diameter and an inner surface. The compressible bushing assembly also includes a shaft bonded to the inner surface of the opening. The compressible bushing assembly also includes a part having an inner surface compressibly attached to the outer surface of the bumper section.

Implementations may include one or more of the following features. The assembly where the bumper section is partially decompressed to secure the bumper section with the part. The assembly the part is of a vehicle body. The assembly the bumper section is compressible to a diameter less than or equal to an opening of the part. The assembly the bushing is preloaded to a selected force. Implementations of the described techniques may include hardware, a method or process, or computer software on a computer-accessible medium.

One general aspect includes a method of installing a bushing into a part. The method of installing also includes providing a bushing having an end and a bumper section, the bumper section having a larger outer diameter than the end. The method of installing also includes compressing the bumper section to a compressed diameter. The method of installing also includes installing the bumper section into an opening of a part. The method of installing also includes rotating the bushing to have a selected preload. The method of installing also includes at least partially decompressing the bumper section to attach the bushing to the part.

Implementations may include one or more of the following features. The method may include bonding a shaft to an opening in the bushing.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A compressible bushing comprising:
an end having a first outer diameter;
a bumper section having a second outer diameter greater than or equal to the first outer diameter and comprised of a compressible material;
an opening passing through the end and the bumper section, the opening having an inner diameter;
the bumper section includes a plurality of gap regions configured to facilitate compression of the bumper section, the plurality of gap regions have a V shape
the bumper section is configured to have its second outer diameter to be equal to one of an installation diameter, an installed diameter, and an uncompressed diameter, the installed diameter being greater than the installation diameter and the uncompressed diameter being greater than the installed diameter;
the bushing rotated according to a selected preload prior to decompression and installation of the bumper section in a tube, the selected preload including a radial rate, an axial rate, a lateral rate and a vertical rate; and
a first section configured to secure an outer diameter of a collar.

2. The bushing of claim 1, further comprising a second end having a third outer diameter less than the second outer diameter and where the opening also passed through the second end.

3. The bushing of claim 1, wherein the plurality of gap regions have a V shape.

4. The bushing of claim 1, the inner diameter of the opening is configured to install a shaft.

5. The bushing of claim 4, an interior surface of the bushing about the opening is mold bonded to the shaft.

6. The bushing of claim 5, the first end includes an expansion opening to hold a collar of the shaft.

7. The bushing of claim 1, the bumper section is compressed to at least the first diameter.

8. The bushing of claim 1, the bumper section is partially uncompressed causing an outer surface to be in contact with an inner surface of a mid section of a tube.

9. The bushing of claim 1, the bushing installed in a tube and configured with a rotation to provide the selected pre load.

* * * * *